June 16, 1925.
F. M. WHITE
SIGNAL DEVICE FOR MOTOR VEHICLES
Filed Feb. 19, 1923
1,542,431
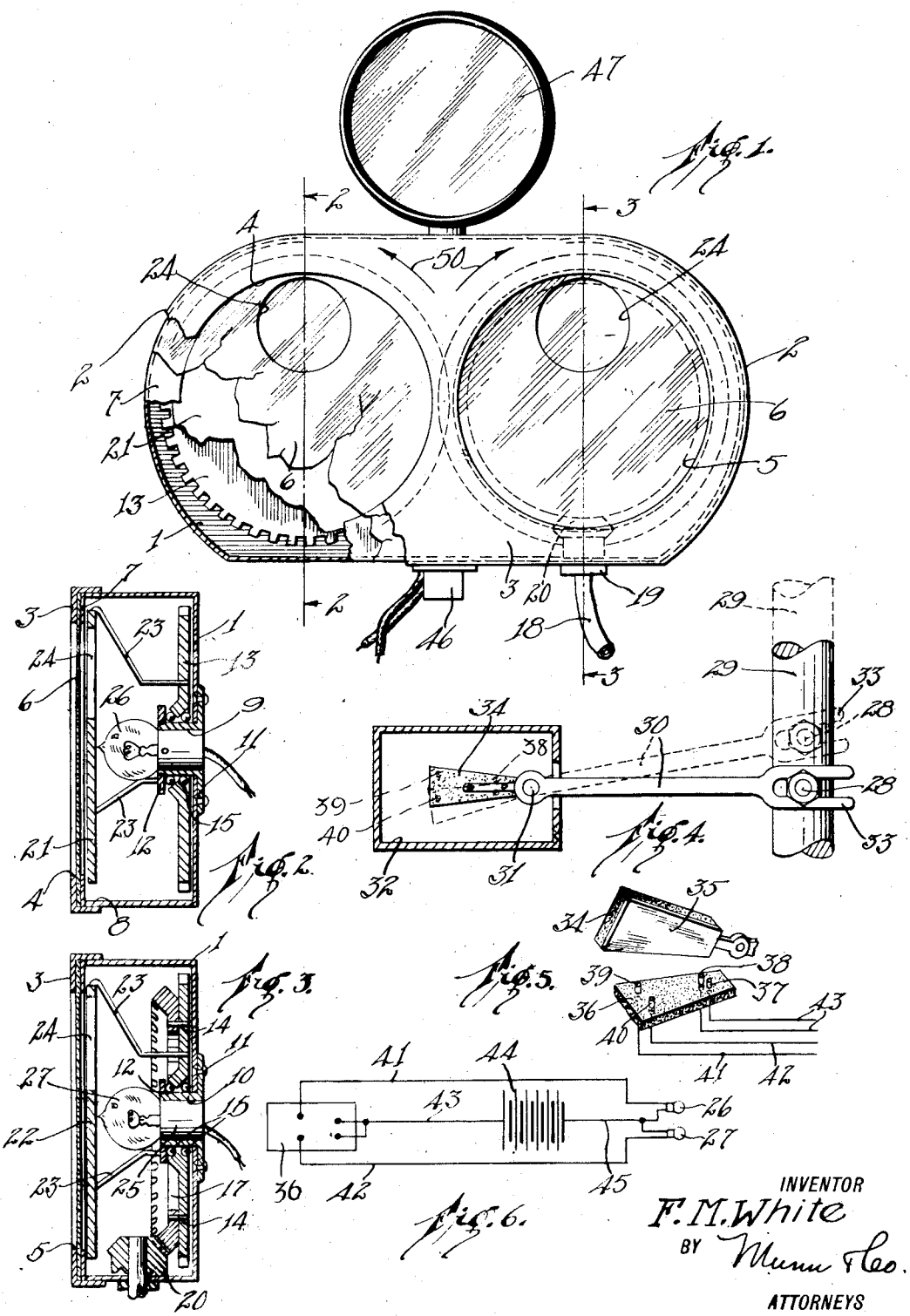
INVENTOR
F. M. White
BY
ATTORNEYS Patented June 16, 1925.

1,542,431

UNITED STATES PATENT OFFICE.

FRANK M. WHITE, OF CHICAGO, ILLINOIS.

SIGNAL DEVICE FOR MOTOR VEHICLES.

Application filed February 19, 1923. Serial No. 620,027.

*To all whom it may concern:*

Be it known that I, FRANK M. WHITE, a citizen of the United States, and a resident of Chicago, in the county of Cook and State of Illinois, have invented a new and useful Improvement in Signal Devices for Motor Vehicles, of which the following is a full, clear, and exact description.

My invention relates to improvements in signal devices for motor vehicles, and more particularly to that type of signal device which is intended to indicate to the observer the general direction in which the vehicle is moving and the relative speed of the vehicle, and it consists in the combinations, constructions, and arrangements herein described and claimed.

An object of my invention is to provide a device of the character described by means of which an observer may have knowledge as to which direction the fore wheels of the motor vehicle are turned.

A further object of my invention is to provide a device of the character described by means of which an observer may know and calculate the approximate speed of the motor vehicle to which the device is attached.

A further object of my invention is to provide a device of the character described that is automatic in operation and which constantly indicates the exact status of the direction, movement, and speed of the motor vehicle.

A further object of my invention is to provide a device of the character described that is durable in construction, compact in form, and thoroughly practical.

Other objects and advantages will appear in the following specification, and the novel features of the invention will be particularly pointed out in the appended claims.

My invention is illustrated in the accompanying drawings forming part of this application, in which Figure 1 is a front elevation of an embodiment of my invention, a portion thereof being broken away, Figure 2 is a sectional view along the line 2—2 of Figure 1, Figure 3 is a sectional view along the line 3—3 of Figure 1, Figure 4 is a top plan view of a portion of the switch mechanism for controlling my signal device, Figure 5 is a diagrammatic view of a portion of the switch mechanism illustrated in Figure 4, and Figure 6 is a diagrammatic view of the electrical connections employed in carrying out my invention.

In carrying out my invention, I make use of an elongated casing 1 having its end walls rounded as indicated at 2. The front or open face of the casing 1 is closed by means of a cover plate 3. The cover plate is provided with a pair of circular apertures 4 and 5.

A colored glass 6 is disposed immediately within the cover plate 3. I prefer to employ a red glass, since a red light may be more easily distinguished at night than most other colored lights. A template 7 is disposed between the glass and the front edge 8 of the casing 1.

A pair of hollow sleeves 9 and 10 (see Figures 2 and 3) are secured to the casing 1 by means of rivets 11 and project within the casing, the forward ends of the sleeves 9 and 10 being threaded and provided with lock nuts 12. A pair of gear wheels 13 and 14 are rotatably mounted upon the sleeves 9 and 10 respectively, there being ball races 15 disposed between the outer wall of the sleeves 9 and 10 and the gears 13 and 14 respectively. The gears 13 and 14 are in mesh with one another. The gear 14 has secured to its outer face a second and smaller gear 17. This gear 17 is mounted concentric with the gear 14 and is of the type known as a beveled gear, the teeth being cut at an angle of 45 degrees from the peripheral wall of the gear 14. A flexible shaft 18 is projected through the casing 1 in a suitable bearing 19 and a beveled pinion 20 is carried by that portion of the shaft 18 within the casing 1. The pinion 20 is in mesh with the beveled gear 17 so that rotation of the shaft 18 will cause the rotation of the gears 13 and 14 in opposite directions from one another. This is true because the gears are driven one by the other.

The opposite end of the flexible shaft 18 is connected to any one of the fore wheels of the motor vehicle on which the device is shown. These wheels nor the connection thereto are not shown since such structure is common and well known in the art. Ordinarily the device employed consists in a small wheel mounted concentric with the axis of the larger or supporting wheel and a relatively small pinion in mesh with the small gear. The pinion is disposed directly upon the shaft 18 so that rotation of the large wheel by contact with the road by virtue of the driving power of the vehicle, may cause a like movement of the pinion and subsequently rotate the shaft 15. It will be noted therefore that the speed at which the gears 13 and 14 rotate will be directly proportional to the speed at which the motor vehicle is moving. Further reference to this condition will be hereinafter noted.

Opaque circular apertured shutters 21 and 22 are supported by means of wire brackets 23 upon the gears 13 and 14 respectively. The apertured shutters 21 and 22 are disposed adjacent and parallel to the template 7 in the casing and are concentric with the axis of the gears 13 and 14 respectively. Each of the apertured shutters 21 and 22 is provided with a circular opening 24. These openings are disposed intermediate the central portion of the apertured shutters and the peripheral edge thereof. The apertured shutters are set upon the gears 13 and 14 so that the openings 24 are at all times at an equal distance from the center of the casing 1, i. e., the relative position of the openings 24 as shown in Figure 1.

Incandescent lamp sockets 25 are mounted within the hollow sleeves 9 and 10 and incandescent lamps 26 and 27 selectively and simultaneously at the required time is provided in a pin 28 disposed upon the cross bar 29 of the steering mechanism of the motor vehicle. This cross bar 29 is usually connected directly to the steering knuckle and moved longitudinally in a path transverse to the frame of the car. A bifurcated member 30 is pivotally mounted at 31 within a suitable supporting casing 32 and its bifurcated portion 33 is in engagement with the pin 28 so that movement of the cross bar 29 will occasion a pivotal movement of the member 30.

The opposite end of the member 30 has secured thereto an insulating block 34. The under surface of the member 33 has a metal plate 35 fixed thereto.

A stationary insulating block 36 is carried within the casing 32 and is provided with four contact members 37, 38, 39, and 40. The contact members 39 and 40 are connected directly with one terminal of the lamps 26 and 27 respectively, by means of conducting wires 41 and 42. The contact members 37 and 38 are connected by means of a wire 43 with one terminal of an electric current source 44. The opposite terminal of the current source 44 is connected by means of a wire 45 to the remaining terminals of the lamps 26 and 27.

A bracket 46 is provided on the casing 1 so that the casing may be supported upon the rear end of the motor vehicle. The ordinary tail lamp construction as shown at 47 is supported upon the top of the casing 1 and is connected directly through the current source of the car to a suitable control switch not shown. This construction has no active part in the carrying out of my present invention other than acting as a marker so that an observer may know which of the two lamps 26 and 27 is in operation in a manner hereinafter described.

From the foregoing description of the various parts of the device, the operation thereof may be readily understood. Let us assume that a motor vehicle equipped with my improved signal device is moving along the road at a definite rate of speed. For the purpose of illustration, twenty-five miles an hour and that it is during the night time. The apertured shutters 13 and 14 will move in the direction of the arrow 50 in directions opposite to one another. This is true because the car is moving in a forward direction and I choose to connect the flexible shaft in such a manner that the gears 13 and 14 will follow the direction of the arrow 50 as the car moves ahead. Since the car is moving directly ahead, the pivotal arm 30 will be shown in the position shown in full lines in Figure 4. This is because the wheels are straight. The block 35 will therefore contact all of the contact points 37 to 40 inclusive and the current from the current source 44 will flow by means of the wire 43 through the block 35 and by way of the conducting wires 41 and 42 through the lamps 35 and 36, respectively. Both lamps will therefore be in operation. An observer in the rear of the vehicle will therefore notice two colored bright spots which are brought about by the apertures 24 in the discs 21 and 22. These spots will move in the direction of the arrows 50 at a certain definite uniform speed. Any quickening in the movement of the spots 24 will indicate to the observer that the driver of the motor vehicle to which the device is applied has increased the speed of the car. Any slackening in the movement of the bright spots which may be seen from a good distance will indicate to the observer that the driver of the motor vehicle has slackened the speed of the vehicle. Such signals are of utmost importance, especially in city driving where a great many vehicles are upon the street at one time and a sudden change of speed often brings about a rear on collision, doing great damage to either of the vehicles.

Let us assume now that the driver of the motor vehicle shall turn his fore wheels to the right as in turning the vehicle to the right. Simultaneous with the moving of the steering mechanism, the lever 30 will pivot upon its center 31 and the lever 30 will assume the position shown in dotted lines in Figure 4. It will be noted therefore that only the contacts 37 and 40 are connected with one another through the plate 35 and that therefore only the lamp 27 will burn. Therefore the lamp 26 will be darkened and the aperture 24 in the disc 21 will not permit a bright spot to appear upon the red glass 6. The disappearance of one of the two spots will immediately indicate to the observer that the fore wheels of the vehicle ahead have been turned in the direction indicated.

Let us assume the vehicle ahead comes to a slow stop and that the wheels are straight ahead again. This slackening of the speed will be at all time noticeable to the observer by virtue of the movement of the bright spots as shown in the apertures and as heretofore described. When the vehicle is at a standstill, the spots will not move, but will be stationary. If now the motor vehicle is thrown in reverse gear and driven backwards, the rotation of the gears 13 and 14 will be opposite to the direction of the arrow 50 and the observer will have instant notice that the vehicle ahead is backing up and is not traveling in a forward direction. Here again the device has communicated instantly information of utmost importance to the observer and therefore the possibility of accidental colliding through miscalculations is greatly abated.

The provision of the lock nuts 12 makes possible the accurate adjustment of the bearing for the gears 13 and 14.

I claim:

1. The combination with a motor vehicle having a driving mechanism and a steering mechanism, of a housing arranged to be mounted on said motor vehicle, means within the housing connected with the driving mechanism for visually indicating the relative speed and direction at which the motor vehicle is driving, said means comprising a pair of apertured shutters arranged to rotate in opposite directions from one another, a pair of incandescent lights disposed in said housing, one for each of said shutters, and switch operated means controlled by said steering mechanism for operating said incandescent lights selectively as said steering mechanism is turned to the left or right.

2. The combination with a motor vehicle having a driving mechanism and a steering mechanism, of a housing arranged to be mounted upon said vehicle adjacent the rear end thereof, the housing having a pair of transparent tinted windows, a pair of apertured shutters rotatably mounted within the housing and arranged to move in opposite directions from one another, means for rotating said apertured shutters, said means being actuated by said drive mechanism of said motor vehicle, an incandescent lamp disposed behind each of said apertured shutters, and a switch mechanism associated with said steering mechanism and arranged to be operated thereby so that but one of said lamps may operate when said steering mechanism is set to turn said motor vehicle in either direction and so that both of said lamps will operate when said steering mechanism is set straight ahead.

3. In a device of the type described, a casing, a pair of gear wheels rotatably mounted in said casing, a pair of circular apertured shutters supported concentric with said gear wheels, incandescent lamps disposed intermediate said apertured shutters and said gear wheels, a switch operated by the steering mechanism of a motor vehicle for selectively controlling said lights as said vehicle is turned to the left or to the right, a tinted transparent member disposed in said apertured shutter, and means associated with one of said gear wheels for connecting said gear wheels with the driving means of a motor vehicle, whereby the gear wheels may rotate at a speed proportional to the speed of said vehicle.

FRANK M. WHITE.